US012361945B2

(12) United States Patent
Verhoeve et al.

(10) Patent No.: US 12,361,945 B2
(45) Date of Patent: *Jul. 15, 2025

(54) VOICE CONTROL DEVICE WITH PUSH-TO-TALK (PTT) AND MUTE CONTROLS

(71) Applicant: Roku, Inc., San Jose, CA (US)

(72) Inventors: Dustin Verhoeve, San Jose, CA (US); Ralph Birt, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,478

(22) Filed: May 21, 2024

(65) Prior Publication Data

US 2024/0312458 A1 Sep. 19, 2024

Related U.S. Application Data

(63) Continuation of application No. 17/348,928, filed on Jun. 16, 2021, now Pat. No. 12,033,625.

(51) Int. Cl.
*G10L 15/22* (2006.01)
*H04N 21/422* (2011.01)

(52) U.S. Cl.
CPC ....... *G10L 15/22* (2013.01); *H04N 21/42203* (2013.01); *H04N 21/42204* (2013.01); *G10L 2015/223* (2013.01)

(58) Field of Classification Search
CPC .. H03G 3/20; H04R 3/00; G10L 15/22; G10L 2015/223

(Continued)

(56) References Cited

U.S. PATENT DOCUMENTS 9,749,700 B1 8/2017 Hollinger
2015/0244406 A1 8/2015 Abdullah et al.
(Continued)

FOREIGN PATENT DOCUMENTS

JP  6729555 B2  7/2020
KR  10-2015-0040445 A  4/2015
(Continued)

OTHER PUBLICATIONS

International Search Report and the Written Opinion of the International Searching Authority directed to International Application No. PCT/US2022/033860, mailed Sep. 30, 2022; 7 pages.

(Continued)

*Primary Examiner* — George C Monikang
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for a voice control device including a microphone, a mute control, and a push-to-talk (PTT) control. An example embodiment operates by: entering a mute state from an always-listening state when the device receives a mute control signal; entering a PTT state from the mute state when the device is in the mute state and receives a first PTT control signal; activating the microphone when the device is in the PTT state; and entering the mute state from the PTT state when the device is in the PTT state and receives a second PTT control signal.

20 Claims, 8 Drawing Sheets

(58) Field of Classification Search
USPC .......................... 381/110, 122; 704/231, 246
See application file for complete search history.

(56) References Cited

U.S. PATENT DOCUMENTS

| | | |
|---|---|---|
| 2017/0245076 A1 | 8/2017 | Kusano et al. |
| 2019/0200175 A1 | 6/2019 | Ylonen et al. |
| 2019/0281096 A1 | 9/2019 | Mazzarella et al. |
| 2020/0094932 A1 | 3/2020 | Ichikawa et al. |
| 2022/0406300 A1 | 12/2022 | Verhoeve et al. |

FOREIGN PATENT DOCUMENTS

| | | |
|---|---|---|
| KR | 10-2017-0028238 A | 3/2017 |
| KR | 10-2020-0092756 A | 8/2020 |
| KR | 10-2161913 B1 | 10/2020 |

OTHER PUBLICATIONS

European Search Report, mailed Feb. 20, 2025, for European Patent Appl. No. 22825853.9, 10 pages.

Roku: "How to use voice to search and control your Roku device|Voice search and control instructions | Official Roku Support", Jun. 14, 2021 (Jun. 14, 2021), XP093249368, Retrieved from the Internet: URL:https://web.archive.org/web/20210614075000/https://support.roku.com/ article/208756908, 8 pages.

Screen capture and webpage for YouTube video clip entitled "Roku Voice Remote Pro: Hands-free voice tips & tricks", Apr. 27, 2021 (Apr. 27, 2021), XP093249369, Retrieved from the Internet: URL:https://www.youtube.com/watch?v=ScyAuPKpIKE, 3 pages.

Screen capture and webpage for YouTube video clip entitled "Roku Voice Remote Pro Review", May 20, 2021 (May 20, 2021), XP093249370, Retrieved from the Internet: URL:https://www.youtube.com/watch?v=TAy5u1xkDEk, 3 pages.

VOICE CONTROL DEVICE WITH PUSH-TO-TALK (PTT) AND MUTE CONTROLS

CROSS-REFERENCE TO RELATED APPLICATIONS

This application is a continuation of U.S. patent application Ser. No. 17/348,928 filed Jun. 16, 2021 (now allowed), which is hereby incorporated herein by reference in its entirety.

BACKGROUND

Field

This disclosure is generally directed to a voice control device, and more particularly to a voice control device having a mute control and a push-to-talk (PTT) control.

Background

Voice control devices, which can be referred to as voice responsive devices, have microphones for receiving audible data, e.g., voice commands spoken by users. But, generally, voice control devices do not leave their microphones fully on all the time, due to privacy reasons (users do not want to be listened to constantly) and cost reasons (it is too expensive in terms of computing, battery, and networking resources to continually process everything that is heard).

Because the microphones are not always fully on all the time, voice control devices require a trigger to fully turn on their respective microphones. A trigger is a way for a user to tell his device that "I'm talking to you so pay attention." An example trigger is a wake word spoken by a user. Thus, even when their microphones are not fully on, voice control devices listen for, and activate upon hearing, their respective wake words. For example, for ROKU® media streaming devices (such as ROKU TV), the wake word is "HEY ROKU."

But the detection of spoken wake words is not completely reliable. It is possible that the system may mistakenly think that it heard "HEY ROKU". In such a case, powering up the TV and the display could be very disruptive and frustrating for the user. For example, suppose two people are having a late night conversation, and the ROKU TV in the same room mistakenly believes it hears "HEY ROKU". In this scenario, it will be disruptive to the people in the room when the TV powers up (thereby lighting the room from the TV display), and the room fills with sound from the TV.

Some voice control devices enable users to turn the microphone on/off to preserve privacy and prevent accidental activation. Thus, per the example scenario above, if users want to avoid having their TV accidentally turned on, they could manually mute the microphone by a mute control. But even when the microphone is muted, users may wish to perform other functions, involving push-to-talk (PTT) for example, which may still need use of the microphone.

SUMMARY

Provided herein are system, apparatus, article of manufacture, method and/or computer program product embodiments, and/or combinations and sub-combinations thereof, for a voice control device including a microphone, a mute control, and a push-to-talk (PTT) control. Normally, the voice control device is in an always-listening state after the device is turned on, and the microphone of the device is thus enabled to receive audible data. When the voice control device is in a mute state, the microphone is turned off such that the microphone is not able to receive audible data. While in the mute state, the voice control device can enter a PTT state to activate the microphone to receive audible data when a PTT control signal is received.

An example embodiment operates by: entering an always-listening state after the voice control device is turned on; and entering a mute state from the always-listening state when the device is in the always-listening state and receives a mute control signal. A microphone of the voice control device is enabled and can be turned on by wake words to receive audible data when the device is in the always-listening state. When the voice control device is in the mute state, the microphone is turned off such that the microphone cannot be turned on by wake words. The embodiment further operates by entering a PTT state from the mute state when the device is in the mute state and receives a first PTT control signal; activating the microphone when the device is in the PTT state; and entering the mute state from the PTT state when the device is in the PTT state and receives a second PTT control signal.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for managing a mute state and a push-to-talk (PTT) state of a voice control device. When the voice control device is in a mute state, the microphone is turned off such that the microphone is not able to receive audible data. Within the mute state, the voice control device can enter a PTT state to activate the microphone to receive audible data when a PTT control signal is received. In some examples, when a PTT button is pressed, the microphone is turn on by the control signal from the PTT button. When the PTT button is released, the microphone is off, and the voice control device goes back to the mute state.

Multimedia Environment

Figure 1:
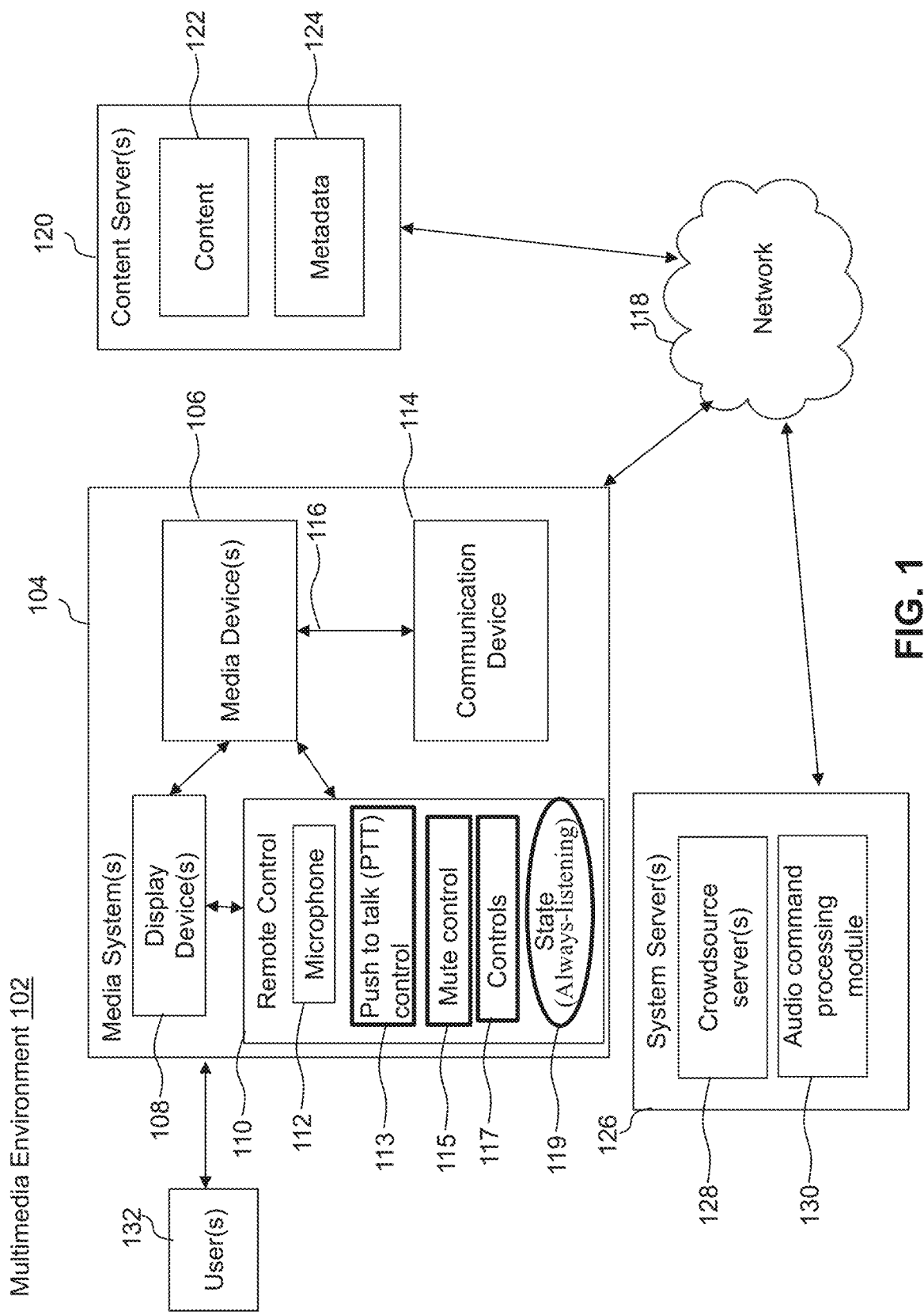
FIG. 1 illustrates a block diagram of a multimedia environment, according to some embodiments.

FIG. 1 illustrates a block diagram of a multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to the multimedia environment 102 of FIG. 1, as will be appreciated by persons skilled in the relevant art(s) based on the teachings contained herein.

In a non-limiting example, the multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof.

For illustrative purposes, the remote control 110 in the media system 104 of multimedia environment 102 is used herein to describe mute state and push-to-talk (PTT) state embodiments. However, the present disclosure is not limited to this example. Instead, the present disclosure is applicable to any voice control device or voice responsive device, such as a digital assistant, appliance, computer, tablet, smart phone, automobile, and internet-of-things (IOT) device, to name just some examples.

Remote control 110 may include a microphone 112, a PTT control 113, a mute control 115, and one or more other controls 117. In addition, remote control 110 can be in a state 119, e.g., an always-listening state, a mute state, a PTT state, and more. A control may be implemented using various ways, e.g., a button, a switch, a key, a highlighted area of a surface, two buttons, two switches, or more. For example, PTT control 113 can be a button that can be pushed, pressed, or released. Additionally and/or alternatively, PTT control 113 can be implemented using two buttons, or a sliding switch. Similarly, mute control 115 can be implemented in various ways. More details of remote control 110 can be found in FIGS. 3A-3B, 4-5, 6A-6B, and 7-8.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie. This crowdsourcing example is described, for example, in U.S. Pat. No. 9,749,700 filed Nov. 21, 2016 and titled "Automatic Display of Closed Captioning Information."

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
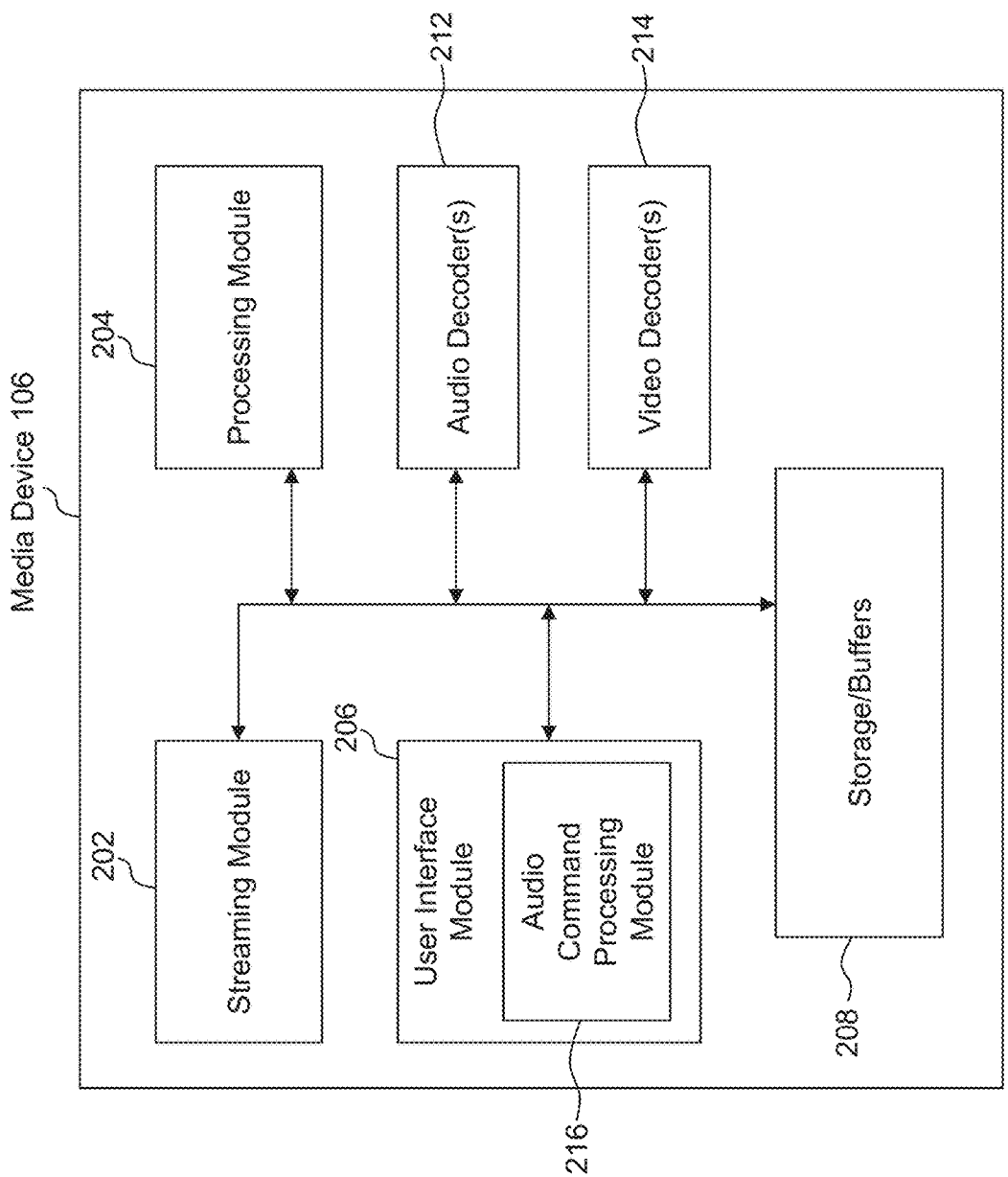
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

As noted above, this disclosure describes various embodiments for managing a mute state and a PTT state of a voice control device. An example of such voice control device is remote control 110. Such embodiments for managing a mute state and a PTT state of a voice control device shall now be discussed in detail.

Managing a Mute State and a Push-to-Talk (PTT) State of a Voice Control Device

Figure 3B:
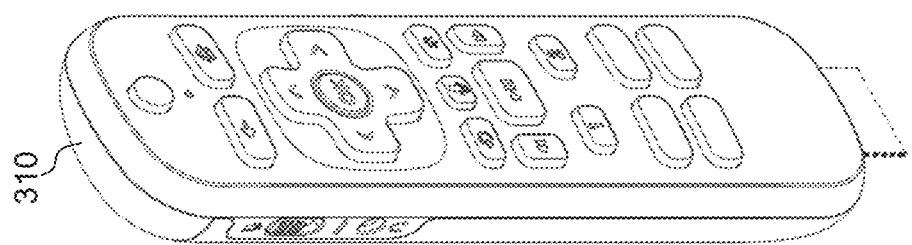
FIGS. 3A-3B illustrate a side view and a top-down view of a voice control device including a mute control and a push-to-talk (PTT) control, according to some embodiments.
Figure 3A:
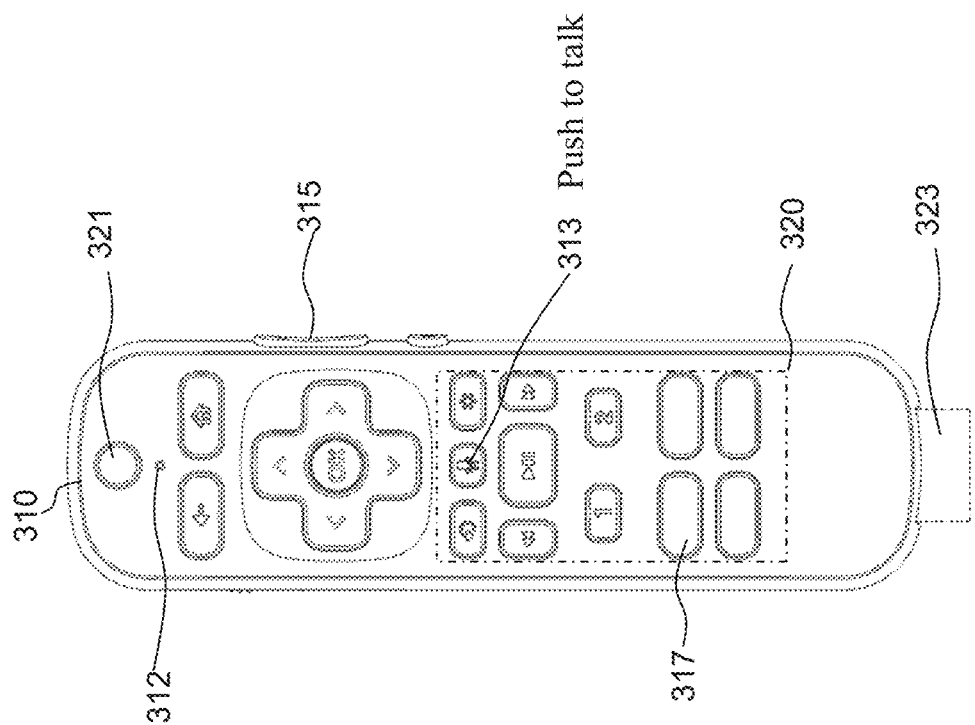

FIGS. 3A-3B illustrate a top-down view and a side view of a voice control device 310 including a mute control and a PTT control, according to some embodiments. The voice control device 310 can include a microphone 312, a mute switch 315, and a PTT button 313. The voice control device 310 can be an example of the remote control 110 of FIG. 1.

Figure 4:
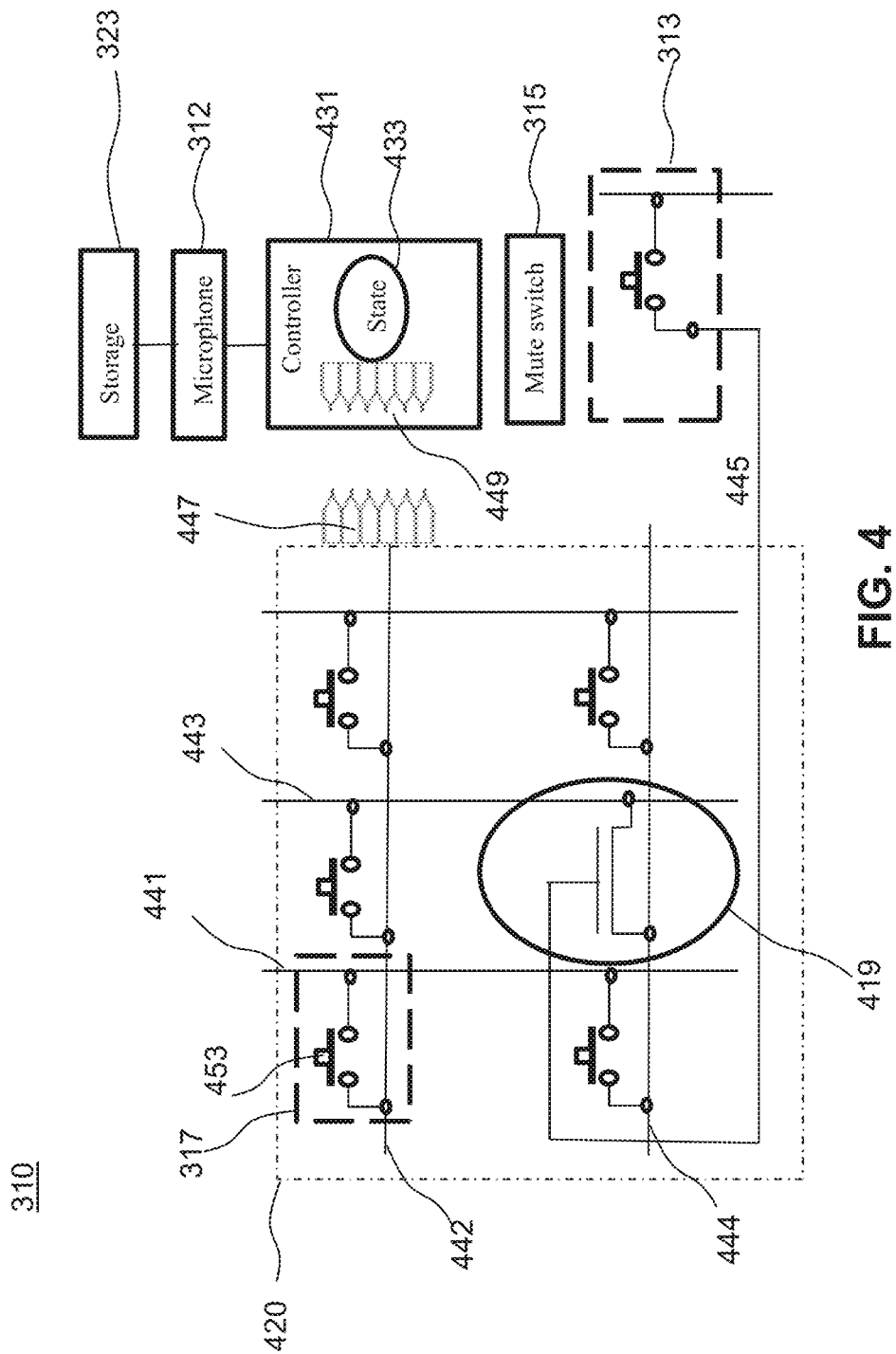
FIG. 4 illustrates an example block diagram of a voice control device including a PTT control coupled to a key matrix, according to some embodiments.

In some embodiments, on the top surface, the voice control device 310 can include the microphone 312, a power button 321 to switch on or off the voice control device 310, and a set of control buttons 320 including various control keys, e.g., a control 317. The set of control buttons 320 can be coupled to a key matrix 420 shown in FIG. 4. In addition, the voice control device 310 can include the mute switch 315 on the side surface and the PTT button 313. The PTT button 313 can be coupled to the key matrix 420 through a transmission gate, as shown in FIG. 4. The voice control device 310 can further include a storage module 323, which can be coupled to a controller, e.g., controller 431 shown in FIG. 4.

In some embodiments, the microphone 312 can be in 3 states: on, off, and enabled. When the microphone 312 is in the on state, which can be referred to as the microphone 312 being on, the microphone 312 can receive audible data, e.g., voice commands from the users 132 via the microphone 312, and the voice control device 310 can perform the corresponding functions based on the voice commands. When the microphone 312 is in the enabled state, wake words, e.g., "HEY ROKU," can turn the microphone 312 into the on state, and wake up the voice control device 310, but other voice commands and audio data will not wake up the voice control device 310. When the microphone 312 is in the off state, which can be referred to as the microphone 312 being off, wake words cannot wake up the voice control device 310.

The mute switch 315 can be a slide switch that can use a slider to move between a mute position and an unmute position. When the mute switch 315 is placed in the mute position, the mute switch 315 can generate a mute control signal. Similarly, when the mute switch 315 is placed in the unmute position, the mute switch 315 can generate an unmute control signal. The PTT button 313 can be pressed and released. The PTT button 313 can generate a first PTT control signal when the PTT button 313 is pressed, and generate a second PTT control signal when the PTT button 313 is pressed.

FIG. 4 illustrates an example block diagram of the internal structure of the voice control device 310 including the mute switch 315, and the PTT button 313 coupled to the key matrix 420 that is coupled and corresponds to the set of control buttons 320, according to some embodiments. The key matrix 420 can be coupled to a controller 431 through connectors 447 and 449, which is further communicatively coupled to the microphone 312 and the storage module 323.

In some embodiments, the voice control device 310 can include the controller 431, which can be coupled to a storage module, e.g., the storage module 323. Software can be stored in storage devices. e.g., storage module 323, and operated by the controller 431. The voice control device 310 can be in a state 433, based on the inputs from the various controls, e.g., control 317, the mute switch 315, the PTT button 313, voice commands detected by the microphone 312, and more. More details of the state 433 are shown in FIG. 5.

In some embodiments, the key matrix 420 can include rows and columns of connections, e.g., a row 442, a row 444, a column 441, and a column 443. The control 317 coupled to the key matrix 420 can include a key 453 that can be pressed up and down. When the key 453 for the control 317 is pressed, the row 442 and the column 441 is coupled together to generate a control signal to the controller 431. Controller 431 can detect that the key 453 is pressed down, and perform the corresponding functions for the control 317. When the key 453 is released, the row 442 and the column 441 is cut off, and controller 431 can stop performing the functions corresponding to the control 317.

In some embodiments, the PTT button 313 can be located outside the key matrix 420 and coupled to the key matrix 420 through a transmission gate 419. The PTT button 313 can be of a similar structure to the key 453 for the control 317. When the PTT button 313 is pressed, a first PTT control signal 445 is generated. The first PTT control signal 445 can be passed through the transmission gate 419, which is coupled to the column 443 and row 444. As shown in FIG. 4, the transmission gate 419 can be a NMOS transistor. In some other embodiments, the transmission gate 419 can be a PMOS transistor, or a CMOS transmission gate. Sometimes, the transmission gate 419 can be referred to as a "fake out" gate since it appears to be a fake key of the key matrix 420, but it is actually outside the key matrix 420. By using a "fake out" gate, the PTT button 313 can be coupled to the controller 431 through the key matrix 420, through the connectors 447 and 449. Hence, the PTT button 313 can be coupled to the controller 431 without using any extra connectors or pins to the controller 431. In some embodiments, the number of connectors or pins to the controller 431 are manufactured, predetermined, and limited. When the key matrix 420 is coupled to the controller 431 through the connectors 447 and 449, there may be no available connector or pins to couple the PTT button 313 to the controller 431. By using a "fake out" gate, the PTT button 313 can overcome the limit on the number of connectors for the connectors 447 and 449, since no additional connector or pin is needed to couple the PTT button 313 to the controller 431. In some embodiments, the PTT button 313 can be implemented within the key matrix 420 for various purposes.

Figure 5:
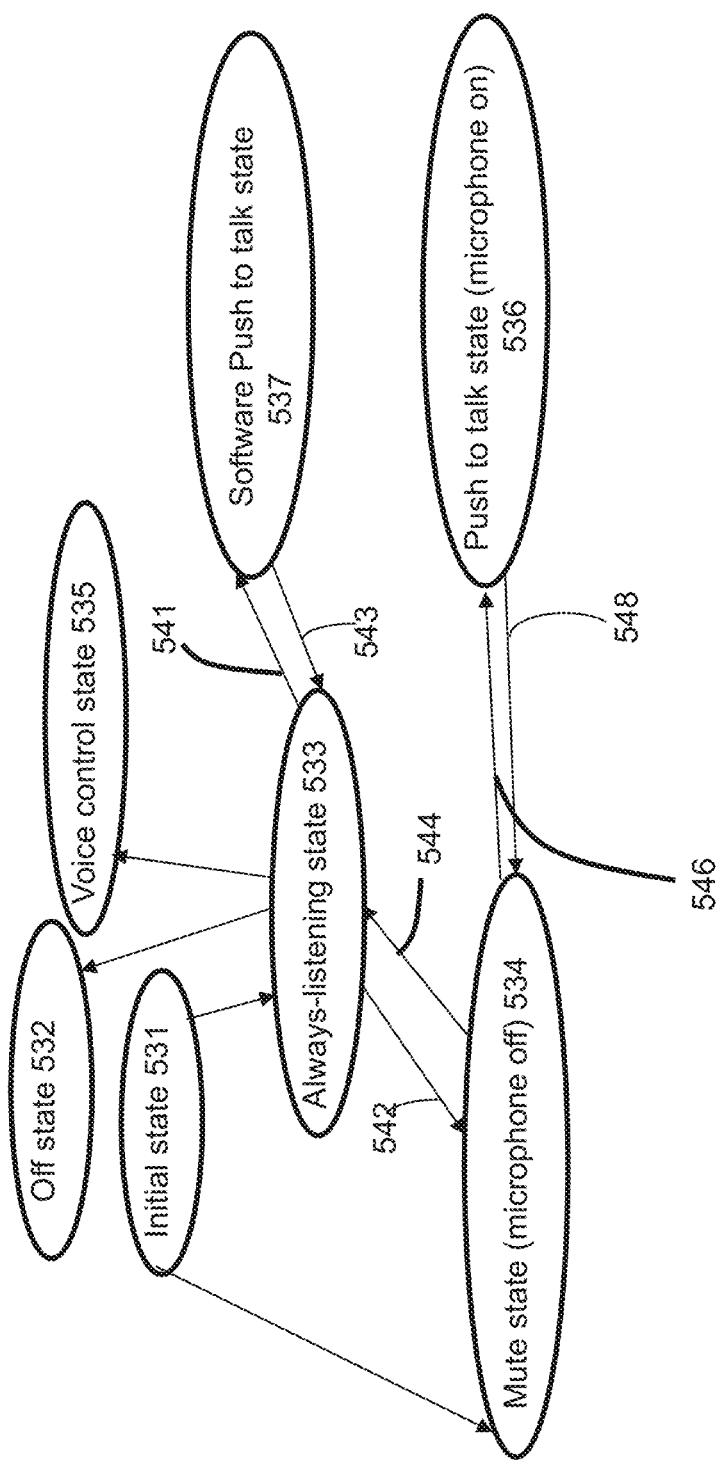
FIG. 5 illustrates a state diagram of operations performed by a voice control device, according to some embodiments.

FIG. 5 illustrates a state diagram 502 of the state 433 shown in FIG. 4, determined by the controller 431 of the voice control device 310, according to some embodiments.

In some embodiments, the state 433 can be any of the states shown in the state diagram 502. For example, the state 433 can be an initial state 531, an off state 532, a voice control state 535, an always-listening state 533, a mute state 534, a PTT state 536, and a software PTT state 537. There can be other states, e.g., low power state, sleep state, or more, not shown in FIG. 5.

In some embodiments, when the voice control device 310 is turned on by pressing the power button 321, the voice control device 310 can enter the initial state 531. While in the initial state 531, the controller 431 can perform various operations related to initialization of the voice control device 310, e.g., starting the operating system, initializing various modules within the voice control device 310, and more. After the voice control device 310 is initialized and stabilized, the voice control device 310 can enter the always-listening state 533.

In some embodiments, in the always-listening state 533, the microphone 312 can be in an enabled state, while the voice control device 310 waits to receive audible wake words via the microphone 312. When the wake words are detected, the voice control device 310 can enter the voice control state 535, and the microphone 312 is fully turned on by the wake words. In the voice control state 535, the voice control device 310 can receive audible data, e.g., voice commands from user 132, and perform operations corresponding to the received audible data.

Alternatively, in the always-listening state 533, the voice control device 310 can enter the off state 532 when the voice control device 310 is powered off. In some embodiments, the voice control device 310 can enter the off state 532 from any other states, not shown in FIG. 5.

In some embodiments, when the voice control device 310 is in the always-listening state 533 and receives a mute control signal, the voice control device 310 can enter the mute state 534 from the always-listening state 533. The mute control signal can be generated by an operation 542, which may be an action to slide the mute switch 315 to a mute position. When the voice control device 310 is in the mute state 534, the microphone 312 is turned off so that the microphone 312 cannot receive audible data, and cannot be turned on by wake words.

In some embodiments, when the voice control device 310 is in the mute state 534 and receives a first PTT control signal, the voice control device 310 can enter the PTT state 536 from the mute state 534. The first PTT control signal can be generated by an operation 546, which may be an action of pressing and holding the PTT button 313. When the voice control device 310 is in the PTT state 536, the microphone 312 can be turned on or activated so that the microphone 312 can receive audible data, e.g., wake words and commands from the user 132.

In some embodiments, when the voice control device 310 is in the PTT state 536 and receives a second PTT control signal, the voice control device 310 can enter the mute state 534 from the PTT state 536. The second PTT control signal can be generated by an operation 548, which may be an action of releasing the PTT button 313.

In some embodiments, when the voice control device 310 is in the mute state 534, and receives an unmute control signal, the voice control device 310 can enter the always-listening state 533 from the mute state 534. The unmute control signal can be generated by an operation 544, which may be an action to slide the mute switch 315 to the unmute position. In the always-listening state 533, the voice control device 310 can turn the microphone 312 to be in the enabled state, such that wake words can be received and detected by the voice control device 310.

In some embodiments, when the voice control device 310 is in the always-listening state 533 and receives the first PTT control signal (that is, pressing and holding the PTT button 313), the voice control device 310 can enter the software PTT state 537 from the always-listening state 533. When the voice control device 310 is in the software PTT state 537, the microphone 312 can be turned on by wake words to receive audible data, e.g., user commands. Hence, pressing the PTT button 313 can result in different actions when the voice control device 310 is in different states, such as the mute state 534 (described above) versus the always-listening state 533 (described in this paragraph). For example, in some embodiments, since the microphone 312 is already enabled in the always-listening state 533, the first PTT control signal may act as a software interrupt to the controller 431 to start recording microphone data while the PTT button 313 is pressed, in addition to transitioning to the software push to the software PTT state 537.

In some embodiments, when the voice control device 310 is in the software PTT state 537 and receives the second PTT control signal (that is, generated by releasing the PTT button 313), the voice control device 310 can enter the always-listening state 533 from the software PTT state 537. Similar to the above description, releasing the PTT button 313 can result in different actions when the voice control device 310 is in different states.

Figure 6:
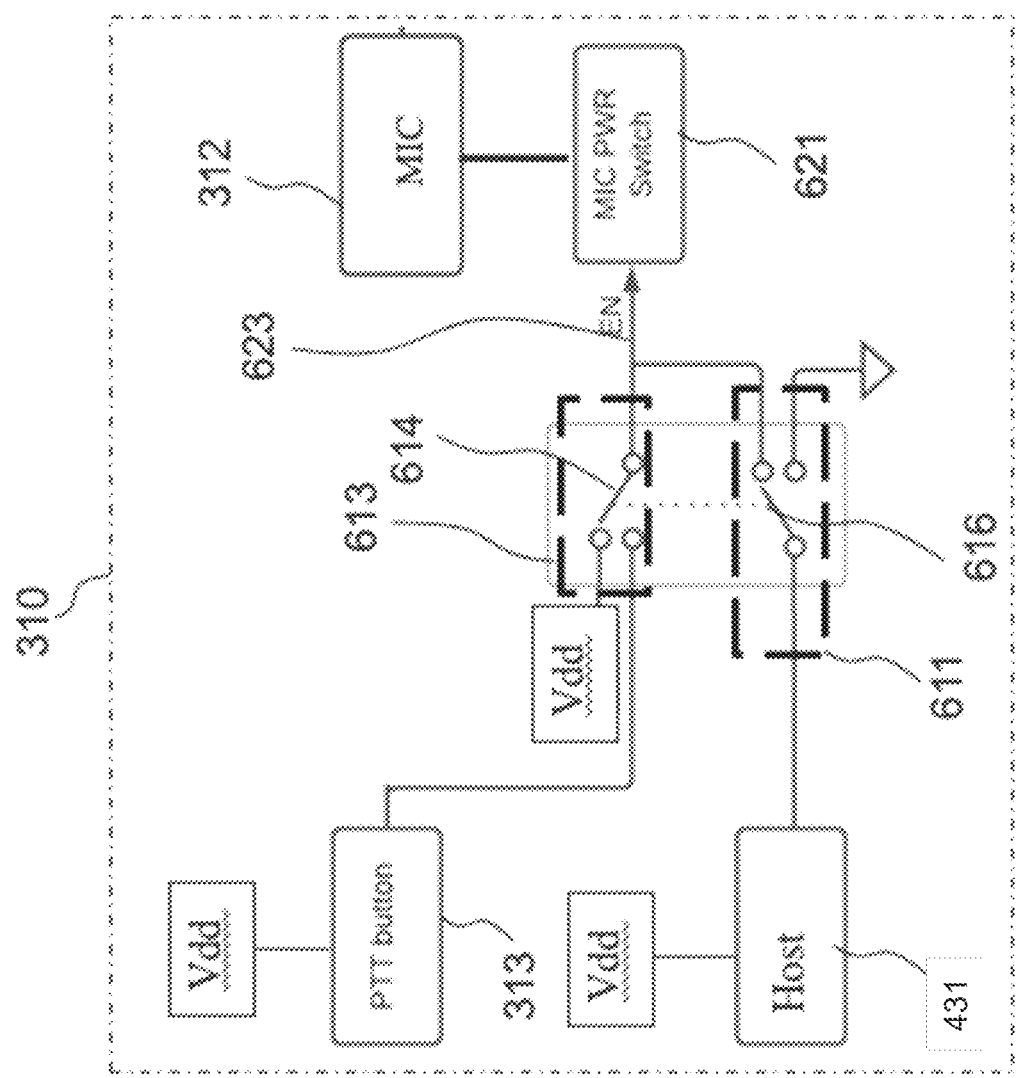
FIG. 6 illustrate an example circuit diagram of the voice control device including a PTT control, according to some embodiments.

FIG. 6 illustrates an example circuit diagram of the voice control device 310 including the PTT button 313 to control the microphone 312 according to the descriptions for FIG. 5. The microphone 312 is controlled by a microphone power switch 621, which is controlled by an enable signal 623. When the enable signal 623 has a high voltage input Vdd, the microphone power switch 621 is enabled. On the other hand, if the enable signal 623 does not have a high voltage input Vdd, the microphone power switch 621 is disabled. The enable signal 623 can be the output of a switch 613 controlled by the PTT button 313, or the output of a switch 611 controlled by the host 431. In some embodiments, the switch 613 and the switch 611 can be implemented by a NMOS transistor or a PMOS transistor.

When the mute switch 315 is in the unmute position, the voice control device 310 enters the always-listening state 533 from the mute state 534. The host 431 is coupled to Vdd, and the enable signal 623 is enabled. Therefore, the microphone 312 is in the enabled state when the voice control device 310 is in the always-listening state 533. Accordingly, the PTT signal from the PTT button 313 can act as a software interrupt to start recording microphone data while the PTT button 313 is pressed. When the PTT button 313 is pressed, the voice control device 310 enters the software PTT state 537. After release of the PTT button 313, the software configures the microphone 312 back into always-listening state 533 from the software PTT state 537. The operations can be presented in the truth table below.

| PTT button 313 | MUTE SW 315 | enable signal 623 |
|---|---|---|
| Unpressed | Muted | 0 |
| Pressed | Muted | 1 |
| Don't Care | Unmuted | 1 |

When the mute switch 315 is in the unmute position, the position of the PTT is a don't care condition, as the enable signal 623 is already powered. Controller 431 reads the state of the PTT button 313 through the key matrix, and reconfigures the microphone 312 for pulse density modulation (PDM) pass through instead of the wake on key phrase mode.

The implementation shown in FIG. 6 is just an example of implementations for the functions performed by the mute switch 315 and the PTT button 313 to control the microphone 312 according to the descriptions for FIG. 5. There can be many other ways to implement such functions described for FIG. 5. For example, some alternative implementations may use a multiplexer, a selector, a flip-flop, and other combinational or sequential circuits to implement the functions described for FIG. 5.

Figure 7:
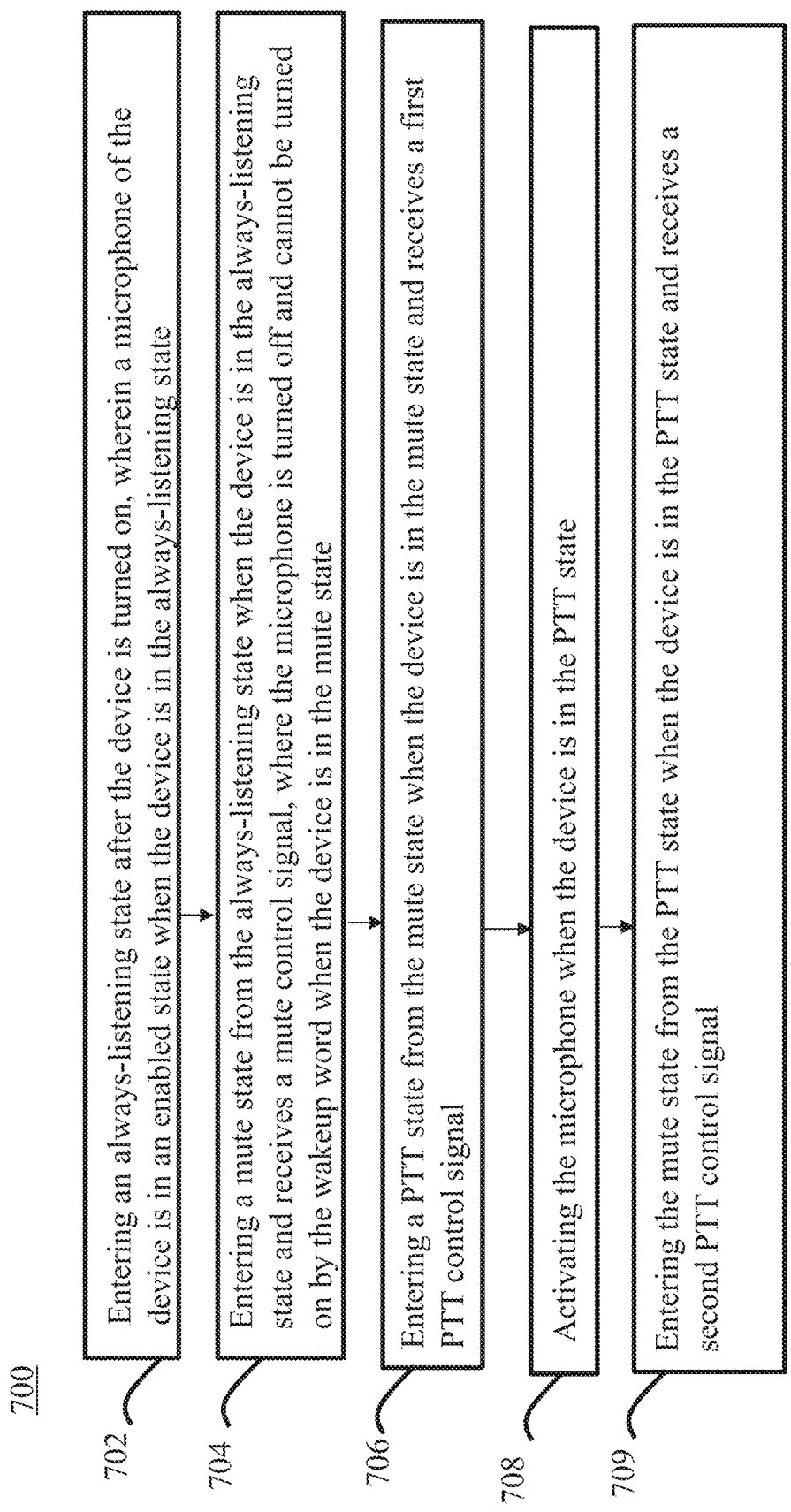
FIG. 7 illustrates an example process performed by a voice control device, according to some embodiments.

FIG. 7 illustrates an example process 700 performed by voice control device 310, according to some embodiments. Processes 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

At 702, the voice control device 310 enters an always-listening state after the device is turned on, where a microphone of the device is in an enabled state. For example, as described for FIG. 5, the voice control device 310 enters the always-listening state 533 after the device 310 is turned on, where the microphone 312 is in the enabled state and can receive audible data.

At 704, the voice control device 310 enters a mute state from the always-listening state when the device is in the always-listening state and receives a mute control signal. The microphone is turned off such that the microphone is not able to receive audible data. For example, the voice control device 310 enters the mute state 534 from the always-listening state 533 when the device 310 is in the always-listening state 533 and receives a mute control signal generated by sliding the mute switch 315 to the mute position. The microphone 312 is turned off such that the microphone 312 is not able to receive audible data.

At 706, the voice control device 310 enters a PTT state from the mute state when the device is in the mute state and receives a first PTT control signal. For example, the voice control device 310 enters the PTT state 536 from the mute state 534 when the device 310 is in the mute state 534 and receives a first PTT control signal generated by pressing and holding the PTT button 313.

At 708, the voice control device 310 activates the microphone when the device is in the PTT state. For example, the voice control device 310 activates the microphone 312 when the device 310 is in the PTT state 536, as shown in FIG. 6A.

At 709, the voice control device 310 enters the mute state from the PTT state when the device is in the PTT state and receives a second PTT control signal. For example, the voice control device 310 enters the mute state 534 from the PTT state 536 when the device 310 is in the PTT state 536 and receives a second PTT control signal generated by releasing the PTT button 313.

Example Computer System

Figure 8:
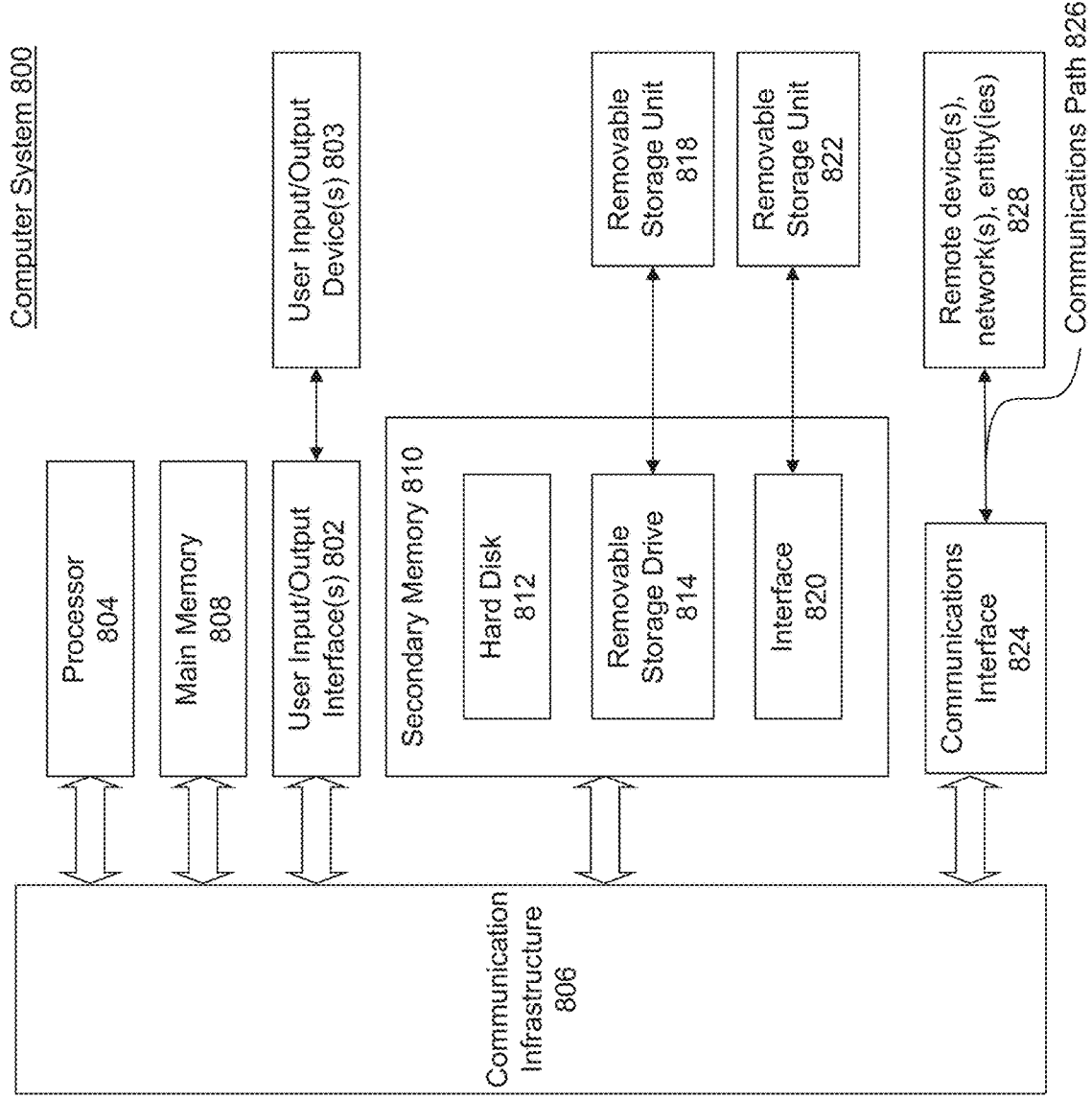
FIG. 8 illustrates an example computer system useful for implementing various embodiments.

Various embodiments may be implemented, for example, using one or more well-known computer systems, such as computer system 800 shown in FIG. 8. For example, the media device 106, the remote control 110, and the voice control device 310 may be implemented using combinations or sub-combinations of computer system 800 to perform various functions described herein, e.g., by the state diagram 502. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for operating a voice control device, comprising:
    entering, by at least one computer processor of the voice control device, a push-to-talk (PTT) state from an always-listening state based on a first PTT control signal, wherein, in the always-listening state, a microphone of the voice control device is placed in an enabled state in which the microphone is enabled to receive audible data, and wherein, in the PTT state, the microphone is placed in an on state in which the microphone is configured to receive voice commands; and
    entering the always-listening state from the PTT state based on a second PTT control signal, thereby placing the microphone in the enabled state.

2. The method of claim 1, further comprising:
    entering a mute state from the always-listening state when the voice control device receives a mute control signal, wherein, in the mute state, the microphone is turned off such that the microphone is not able to receive audible data and not enabled to be turned on by a wake word.

3. The method of claim 2, wherein the mute control signal is generated responsive to a mute switch of the voice control device being placed in a mute position.

4. The method of claim 2, further comprising:
    entering the always-listening state from the mute state when the voice control device receives an unmute control signal, thereby placing the microphone in the enabled state.

5. The method of claim 4, wherein the unmute control signal is generated responsive to a mute switch of the voice control device being placed in an unmute position.

6. The method of claim 1, wherein the first PTT control signal is generated when a PTT button of the voice control device is activated.

7. The method of claim 6, wherein the second PTT control signal is generated when the PTT button is deactivated.

8. A system, comprising:
    a microphone configured to be in at least one of an enabled state or an on state;
    one or more memories; and
    at least one processor each coupled to at least one of the one or more memories and configured to perform operations comprising:
        entering a push-to-talk (PTT) state from an always-listening state based on a first PTT control signal, wherein, in the always-listening state, the microphone is placed in the enabled state in which the microphone is enabled to receive audible data, and wherein, in the PTT state, the microphone is placed in the on state in which the microphone is configured to receive voice commands; and
        entering the always-listening state from the PTT state based on a second PTT control signal, thereby placing the microphone in the enabled state.

9. The system of claim 8, the operations further comprising:
    entering a mute state from the always-listening state when the system receives a mute control signal, wherein, in the mute state, the microphone is turned off such that the microphone is not able to receive audible data and not enabled to be turned on by a wake word.

10. The system of claim 9, wherein the mute control signal is generated responsive to a mute switch of the system being placed in a mute position.

11. The system of claim 9, the operations further comprising:
    entering the always-listening state from the mute state when the system receives an unmute control signal, thereby placing the microphone in the enabled state.

12. The system of claim 11, wherein the unmute control signal is generated responsive to a mute switch of the system being placed in an unmute position.

13. The system of claim 8, wherein the first PTT control signal is generated when a PTT button of the system is activated.

14. The system of claim 13, wherein the second PTT control signal is generated when the PTT button is deactivated.

15. A non-transitory computer-readable medium having instructions stored thereon that, when executed by at least one computing device, cause the at least one computing device to perform operations comprising:
    entering a push-to-talk (PTT) state from an always-listening state based on a first PTT control signal, wherein, in the always-listening state, a microphone of the at least one computing device is placed in an enabled state in which the microphone is enabled to receive audible data, and wherein, in the PTT state, the microphone is placed in an on state in which the microphone is configured to receive voice commands; and entering the always-listening state from the PTT state based on a second PTT control signal, thereby placing the microphone in the enabled state.

16. The non-transitory computer-readable medium of claim 15, the operations further comprising:

entering a mute state from the always-listening state when the at least one computing device receives a mute control signal, wherein, in the mute state, the microphone is turned off such that the microphone is not able to receive audible data and not enabled to be turned on by a wake word.

17. The non-transitory computer-readable medium of claim 16, wherein the mute control signal is generated responsive to a mute switch of the at least one computing device being placed in a mute position.

18. The non-transitory computer-readable medium of claim 16, the operations further comprising:

entering the always-listening state from the mute state when the at least one computing device receives an unmute control signal, thereby placing the microphone in the enabled state.

19. The non-transitory computer-readable medium of claim 18, wherein the unmute control signal is generated responsive to a mute switch of the at least one computing device being placed in an unmute position.

20. The non-transitory computer-readable medium of claim 15, wherein the first PTT control signal is generated when a PTT button of the at least one computing device is activated.

* * * * *